United States Patent [19]

Gaul, Jr.

[11] 4,312,970

[45] Jan. 26, 1982

[54] SILAZANE POLYMERS FROM $\{R'_3SI\}_2NH$ AND ORGANOCHLOROSILANES

[75] Inventor: John H. Gaul, Jr., Midland, Mich.

[73] Assignee: Dow Corning Corporation, Midland, Mich.

[21] Appl. No.: 236,366

[22] Filed: Feb. 20, 1981

[51] Int. Cl.³ .............................................. C08F 30/08
[52] U.S. Cl. ..................................... 526/279; 528/31; 528/32; 528/34
[58] Field of Search .................... 526/279; 528/31, 32, 528/34, 36

[56] References Cited

U.S. PATENT DOCUMENTS

| | | | |
|---|---|---|---|
| 2,564,674 | 8/1951 | Cheronis | 260/448.2 |
| 3,146,250 | 8/1964 | Speier | 528/32 |
| 3,809,713 | 5/1974 | Boersma | 260/448.2 E |
| 3,853,567 | 12/1974 | Verbeek | 106/44 |
| 3,892,583 | 7/1975 | Winter | 106/55 |

OTHER PUBLICATIONS

Redl, Silazane Polymers, ARPA-19, Advanced Research Projects Agency, Oct. 1965.
J. of Polymer Science Part A, vol. 2 pp. 45-55, 3479-3489, 1964.
L. W. Breed, J. of Organic Chemistry, vol. 27, p. 1114, 1962.

Primary Examiner—Paul R. Michl
Attorney, Agent, or Firm—Robert L. McKellar

[57] ABSTRACT

What is disclosed is a process for preparing $R'_3SiNH$—containing silazane polymers by contacting and reacting organochlorosilanes with $\{R'_3Si\}_2NH$ where R' is vinyl, hydrogen, an alkyl radical of 1-3 carbon atoms or the phenyl group. The silazane polymers are useful as chemical intermediates to produce silicon-containing chemical compounds. They are also useful in the formation of silicon carbide-containing ceramic materials.

81 Claims, No Drawings

SILAZANE POLYMERS FROM {R'₃SI}₂NH AND ORGANOCHLOROSILANES

BACKGROUND OF THE INVENTION

This invention relates to the preparation of silazane polymers which are useful as chemical intermediates to synthesize organosilicon compounds. They are useful, when fired at high temperatures, to form silicon carbide and silicon carbide-containing ceramic materials.

What is disclosed herein is a novel process to obtain novel silazane polymers which consists of contacting and reacting organochlorosilanes with disilazanes in an inert, essentially anhydrous atmosphere while distilling volatile by-products.

As is well-known in the art, halosilane monomers will react with ammonia and most organic compounds containing a primary or secondary amino group to give a variety of silazanes. For example, the reaction of trimethylchlorosilane and ammonia produces hexamethyldisilazane, a silazane monomer, while dimethyldichlorosilane and ammonia produce dimethylcyclic silazanes. These two reactions probably constitute the majority of commercial uses of the silazane chemistry.

Silazanes in general have been academic curiosities for many years and a variety of such silazanes, including monomers, oligomers, cyclics and even low molecular weight resins and linear polymers have been prepared by a variety of methods. For example, L. W. Breed et al., in the Journal of Organic Chemistry, 27, 1114(1962) report the formation of silazanes from the polymerization of sterically hindered silazane oligomers, while in the Journal of Polymer Science, A 2 45(1964), cyclic trimer and tetramer silazanes are reported to be thermally cracked, using catalysts, to give linear polymers.

In contrast, fluids, rubbery polymers and resins prepared from $CH_3SiCl_3$, $(CH_3)_2SiCl_2$ and excess ammonia have been reported by Kruger et al. in the Journal of Polymer Science, A 2 3179(1964) and Redl, Silazane Polymer, ARPA-19, Advanced Research Projects Agency, October, 1965.

The patent literature also contains disclosures of the preparation of silazanes. Cheronis, in U.S. Pat. No. 2,564,674 discloses the preparation of low molecular weight linear silazane polymers by the reaction of halosilanes with excess ammonia in a solvent solution. Bausma, et al., in U.S. Pat. No. 3,809,713 discloses a similar reaction scheme with the added modification of removing the by-produced solid ammonium halide using ethylene diamine.

More recently, Verbeek, et al., in U.S. Pat. Nos. 3,853,567 and U.S. Pat. No. 3,892,583 disclosed that mixtures of $CH_3SiCl_3$ and $(CH_3)_2SiCl_2$ can be treated with ammonia or organoamines to form materials that can be pyrolyzed to yield $SiC/Si_3N_4$ ceramics.

In another segment of the prior art, the use of disilanes in the preparation of silazane polymers has been limited to the formation of relatively low molecular weight materials. In one example, Wannagat et al., Ang. Chem. 75(7) 345(1963), reported the reaction of tetramethyldichlorodisilane with gaseous ammonia to give a six-membered cyclic silazane, {(CH₃)₂SiSi(CH₃)₂NH}₂ rather than the expected linear silazane polymer and Hengge et al., Montash. Chem. 101I(2)325(1970), prepared dimethylamino substituted mixtures of disilanes from dimethylamine and the chlorine-containing disilane mixture obtained from the Direct Process for the preparation of chlorosilanes.

The inventor herein, John H. Gaul, Jr., has also recently shown that disilazanes and organochlorodisilanes, when heated to elevated temperatures, will give useful silazane polymers. This work is the subject matter of copending application entitled "A Process For The Preparation of Poly(disilyl)silazane Polymers And The Polymers Therefrom", Ser. No. 225,274, filed Jan. 15, 1981.

What has been newly discovered is the coreaction between chlorine-containing monosilanes and disilazanes to give useful high molecular weight silazane polymers.

THE INVENTION

The instant invention concerns a new class of silazane polymers prepared from chlorine-containing monosilanes and disilazanes. More specifically, certain individual chlorine-containing monosilanes or a specified mixture of chlorine-containing monosilanes are treated with a disilazane, as the nitrogen source, in sufficient amounts to react with all of the chlorine on the chlorine-containing monosilanes. This is usually an equimolar amount of disilazane based on the chlorine content of the monosilane or mixture of monosilanes. For purposes of this invention, monosilanes means $R_nSiCl_{4-n}$ wherein R and n are defined below. The inventor does not wish to be held to such a theory but it is believed that when the mixture is heated, usually in the absence of solvent and in an essentially anhydrous atmosphere, the reaction

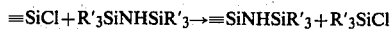
$\equiv SiCl + R'_3SiNHSiR'_3 \rightarrow \equiv SiNHSiR'_3 + R'_3SiCl$ takes place. The reaction is accompanied by the production of R'₃SiCl which is removed by distillation as the reaction proceeds. As the temperature of the reaction mixture is raised, condensation reactions begin to occur, causing formation of a higher molecular weight silazane and {R'₃Si}₂NH. The {R'₃Si}₂NH is also distilled from the reaction as it is formed.

$2\equiv Si-NHSiR'_3 \rightarrow \equiv SiNHSi\equiv + \{R'_3Si\}_2NH$.

As higher temperatures are reached, more crosslinking occurs and any R'₃SiNH— left in the polymer acts as an endblocker. This method permits one to stop the reaction at any point to obtain almost any desired viscosity. The silazane polymers range in physical appearance from liquids, to high viscosity liquids, to hard glassy materials. The materials are therefore very easy to handle. They are essentially hydrolytically stable.

Thus, this invention consists of several aspects, one of which is a process for preparing an R'₃SiNH— containing silazane polymer which consists of contacting and reacting in an inert, essentially anhydrous, atmosphere, an organochlorosilane or a mixture of organochlorosilanes of the general formula

$R_nSiCl_{4-n}$ with a disilazane having the general formula $(R'_3Si)_2NH$ at a temperature in the range of 25° C. to 300° C. while distilling by-produced volatile products, wherein R is vinyl, an alkyl group of 1–3 carbon atoms or phenyl; R' is vinyl, hydrogen, an alkyl group of 1-3 carbon atoms or phenyl and n has a value of 1 or 2.

Another aspect of this invention is a process for preparing an R′₃SiNH— containing silazane polymer which consists of contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $R_nSiCl_{4-n}$ with a disilazane having the general formula
$(R'_3Si)_2NH$ at a temperature in the range of 125° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl; and n has a value of 1 or 2.

This invention also consists of a new and novel composition of matter which is an R′₃SiNH— containing silazane polymer which is prepared by contacting and reacting in an inert, essentially anhydrous, atmosphere, an organochlorosilane or a mixture of organochlorosilanes of the general formula $R_nSiCl_{4-n}$
with a disilazane having the general formula $(R'_3Si)_2NH$ at a temperature in the range of 25° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl and n has a value of 1 or 2.

Also included in this invention is a new and novel composition of matter which is an R′₃SiNH— containing silazane polymer which is prepared by contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $R_nSiCl_{4-n}$ with a disilazane having the general formula $(R'_3Si)_2NH$ at a temperature in the range of 125° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl and n has a value of 1 or 2.

This invention further consists of a method of preparing a silicon carbide-containing ceramic material which consists of heating a silazane polymer in an inert atmosphere or in a vacuum to at least a temperature of 750° C. until the silazane polymer is converted to silicon carbide ceramic material, which silazane polymer is obtained by a process which consists of contacting and reacting in an inert, essentially anhydrous, atmosphere, an organochlorosilane or a mixture of organochlorosilanes of the general formula $R_nSiCl_{4-n}$ with a disilazane having the general formula
$(R'_3Si)_2NH$ at a temperature in the range of 25° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl and n has a value of 1 or 2.

Another aspect of this invention is a method of preparing a silicon carbide-containing ceramic article which consists of (A) forming an article of the desired shape from a silazane polymer; (B) heating the article formed in (A) in an inert atmosphere or in a vacuum to an elevated temperature of at least 750° C. until the silazane polymer is converted to silicon carbide-containing ceramic, which silazane polymer is obtained by a process which consists of contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $R_nSiCl_{4-n}$ with a disilazane having the general formula
$(R'_3Si)_2NH$ at a temperature in the range of 125° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl and n has a value of 1 or 2.

A further aspect of this invention is a method of preparing a filled ceramic article which consists of (A) mixing a silazane polymer with at least one conventional ceramic filler; (B) forming an article of the desired shape from the mixture of silazane polymer and filler and (C) heating the article formed in (B) in an inert atmosphere or in a vacuum to an elevated temperature of at least 750° C. until the silazane polymer is converted to a silicon carbide-containing ceramic, which silazane polymer is obtained by a process which consists of contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $R_nSiCl_{4-n}$ with a disilazane having the general formula
$(R'_3Si)_2NH$ at a temperature in the range of 125° C. to 300° C. while distilling by-produced volatile products, wherein R is vinyl, an alkyl group of 1-3 carbon atoms or phenyl; R′ is vinyl, hydrogen, an alkyl group of 1-3 carbon atoms or phenyl and n has a value of 1 or 2.

Yet another aspect of this invention is a method of preparing an article coated with filled ceramic material which consists of (A) mixing a silazane polymer with at least one conventional ceramic filler, (B) coating a substrate with the mixture of silazane polymer and filler and, (C) heating the coated substrate in an inert atmosphere or in a vacuum to an elevated temperature of at least 750° C. until the coating is converted to a silicon carbide ceramic material, whereby a silicon carbide-containing ceramic coated article is obtained, which silazane polymer is obtained by a process which consists of contacting and reacting in an inert, essentially anhydrous, atmosphere, an organochlorosilane or a mixture of organochlorosilanes of the general formula $$R_nSiCl_{4-n}$$

with a disilazane having the general formula $$(R'_3Si)_2NH$$

at a temperature in the range of 25° C. to 300° C. while distilling by-produced volatile products, wherein R is vinyl, an alkyl group of 1–3 carbon atoms or phenyl; R' is vinyl, hydrogen, an alkyl group of 1–3 carbon atoms or phenyl and n has a value of 1 or 2.

A final aspect of this invention is a method of preparing an article coated with unfilled ceramic material which method consists of (A) coating a substrate with a silazane polymer, (B) heating the coated substrate in an inert atmosphere or in a vacuum to an elevated temperature of at least 750° C. until the coating is converted to a silicon carbide ceramic material, whereby a silicon carbide-containing ceramic coated article is obtained, which silazane polymer is obtained by a process which consists of contacting and reacting in an inert, essentially anhydrous, atmosphere, an organochlorosilane or a mixture of organochlorosilanes of the general formula $$R_nSiCl_{4-n}$$

with a disilazane having the general formula $$(R'_3Si)_2NH$$

at a temperature in the range of 25° C. to 300° C. while distilling by-produced volatile products, wherein R is vinyl, an alkyl group of 1–3 carbon atoms or phenyl; R' is vinyl, hydrogen, an alkyl group of 1–3 carbon atoms or phenyl and n has a value of 1 or 2.

The inventions described herein result in new compositions of matter which are an improvement in the art, in that, essentially hydrolytically stable, easy to handle silazane polymers can be prepared. Further, the silazane polymers and the method of their preparation lead to an improvement in the art of formation of silicon carbide and silicon carbide ceramic materials. The polymers are also useful as binders in ceramic materials.

The invention results from reacting disilazanes with organochloromonosilanes or mixtures of such silanes in an inert, essentially anhydrous atmosphere and then firing the resulting silazane polymer to get silicon carbide or silicon carbide-containing ceramic material.

The organochloromonosilanes of this invention are those having the general formula $$R_nSiCl_{4-n}.$$

In this formula, R is vinyl or an alkyl radical containing 1–3 carbon atoms or the phenyl group. Thus, those groups which are contemplated as being useful in this invention are methyl, ethyl, propyl, vinyl and phenyl.

For purposes of this invention, the R groups can all be the same or they can be different. The organochloromonosilanes are common commodity chemicals and are commercially available and therefore, an explanation as to their preparation does not appear to be necessary herein. Whenever the symbols $\phi$, Me, Et and Vi are used herein, their meaning is phenyl, methyl, ethyl and vinyl, respectively.

For purposes of this invention, the value of n is 1 or 2. Thus, this invention contemplates the use of single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic substituted silanes such as $(CH_3)_2SiCl_2$, $(C_2H_5)_2SiCl_2$ and $(CH_2=CH)(CH_3)SiCl_2$ and the use of mixtures of such silanes, for example, $CH_3SiCl_3$ and $(CH_3)_2SiCl_2$. One aspect of this invention requires that whenever certain organochlorosilane mixtures are used in this invention, the number of units of diorgano-substituted silicon atoms should not exceed the number of units of monoorgano-substituted silicon atoms. Even though silazane polymers can be formed from reactants wherein the diorgano-substituted units exceed the number of monoorgano-substituted units, it has been found that these polymers have much less desirable properties because of low viscosities. They also have resulting decreased physical properties upon firing.

The second reactant in this invention is a disilazane of the general formula $(R'_3Si)_2NH$. R' is this formula is vinyl, hydrogen, an alkyl radical of 1–3 carbon atoms or the phenyl group. Therefore, R', for purposes of this formula is represented by hydrogen, methyl, ethyl, propyl, vinyl and phenyl. As set forth above, each R' group in this formula can be the same or they can be different. Examples of compounds contemplated within the scope of this invention include:

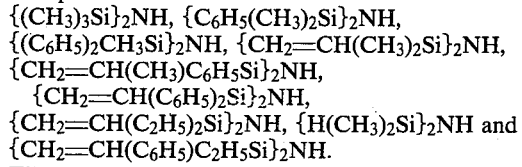

These reactants are brought together in an inert, essentially anhydrous atmosphere. For purposes of this invention what we mean by "inert" is that the reaction is carried out under a blanket of inert gas, such as, argon or nitrogen or helium. What we mean by "essentially anhydrous" is that the reaction is preferably carried out in an absolutely anhydrous atmosphere but minute amounts of moisture can be tolerated.

When the reactants are contacted with each other, the reaction begins which forms an intermediate amino compound. Upon heating, additional amino compound is formed and upon continued heating, $R'_3SiCl$ is distilled from the reaction mixture and a silylsilazane polymer is formed. The order of addition of the materials does not appear to be critical. As the temperature is raised higher, more condensation takes place and cross-linking occurs, with residual $R'_3Si-$ that is not distilled from the mixture, acting as a chain-stopper. This control allows one to stop the reaction at any point to obtain almost any desired viscosity. The desirable temperature range for this reaction is 25° C. to 300° C. A preferred temperature range for this reaction is 125°–300° C. The length of time that the reaction requires depends on the temperature and the viscosity one wishes to achieve.

What is meant by "volatile products" are the distillable by-produced products that are formed by the reactions set forth above. These materials can be represented by $(CH_3)_3SiCl$, $(CH_2=CH)(C_6H_5)_2SiCl$, $CH_3(C_6H_5)_2SiCl$, $(CH_3)_2C_6H_5SiCl$ and $(CH_2=CH)(CH_3)_2SiCl$. Sometimes, these materials require the use of a vacuum along with the heat in order to remove them from the reaction mixture.

The silazane polymers are then essentially ready to use. The silazane polymers are pyrolyzed in an inert atmosphere or in a vacuum at temperatures of at least 750° C. to give a silicon carbide containing material. If the polymer is of sufficient viscosity, it can be shaped first (such as an extruded fiber) and then pyrolyzed to give a silicon carbide containing fiber or the silazane polymers can be filled with ceramic type fillers (if desired) and then fired to at least 750° C. to obtain silicon carbide ceramic materials or silicon carbide ceramic material-containing ceramic articles.

When mixtures of organochlorosilanes are to be used, it is best if the silanes are mixed prior to contacting and reacting with the disilazanes.

As mentioned above, some of the resulting polymers can be extruded to give various shapes such as fibers. It has been found that the polymers of this invention that have the handleability that enables one to extrude or form them are those polymers in which the number of diorgano-substituted silicon atoms does not exceed the number of monoorgano-substituted silicon atoms.

As mentioned above, the polymers of this invention can be used in both the filled and unfilled state, depending on the application. Thus, it is contemplated within the scope of this invention to coat substrates with filled and unfilled polymers and heat the substrates to produce silicon carbide-containing ceramic coated articles. Fillers and adjuvants can be milled on 3 roll mills by simply mixing the silazane polymers of this invention with the fillers and making several passes on the mill. In the alternative, the polymers can be placed in solvents and the fillers and adjuvants can be added thereto and after mixing the solvent can be removed to give the filled polymer.

The coating can be carried out by conventional means. The means used depends on the polymer and substrates used and the application one has in mind. Thus, these materials can be brushed, rolled, dipped or sprayed. In the filled state, it is sometimes necessary to trowel the polymer onto the substrate.

Whenever the polymers are converted to the ceramic state, it is done by pyrolyzing the polymer to a temperature of at least 750° C. in an inert atmosphere or in a vacuum.

Attempts to pyrolyze at or above 750° C. without an inert atmosphere lead to undesirable side reactions and therefore, caution should be exercised to be sure to exclude moisture and other potential reactants.

Now so that those skilled in the art can better appreciate and understand the invention, the following examples are given. These examples are for purposes of illustration only and are not to be regarded as limitations.

In the following examples, the analytical methods used were as follows:

Thermogravimetric analyses (TGA) were carried out on a Netzsch STA 429 (2400° C.) TGA instrument manufactured by Netzsch Instruments, Selb, West Germany. Sample sizes averaged 11 mg., program rate was 10° C./min., gas flow rate was 200 cc/min. The scale setting was 50° C./in.±0.5° C./in.

Differential Thermal Analyses (DTA) were carried out on the Netzsch instrument using samples averaging 13.5 mg., a flow rate of 200 cc/min., a program rate of 10° C./min and a scale setting of 50° C./in±0.5° C./in.

Percent Silicon was determined by a fusion technique which consisted of converting the silicon material to soluble forms of silicon and the soluble material is quantitatively determined as total silicon by atomic absorption spectrometry. Solubilization takes place by weighing the sample into a Parr-type fusion cup (about 0.3 gm), adding 15.0 gms of Na peroxide, heating for about 90 sec. and quenching in cold water. The material is placed in a nickel beaker containing 150–200 ml. of distilled water. 55 ml. of reagent grade acetic acid is added and diluted with water to 500 ml. volume.

Percent Chlorine (residual) was determined by Na peroxide decomposition and titration with silver nitrate. Fusion of the halides with Na peroxide is followed by potentiometric titration with standard silver nitrate by weighing a sample into a gellation capsule, placing about 1.5 gm. of $Na_2O_2$, about 0.7 gm of $KNO_3$ and about 0.15 gm of sugar into a clean, dry reaction cup and burying the capsule in the mixture. The cup is filled with $Na_2O_2$ and placed in a reaction vessel. It is heated for 1–1½ min. and quenched in cold water. The cup and vessel are washed and the washings are collected. The washings are heated to dissolve any solids. 15 ml. of cold 1:1 50% aqueous $H_2SO_4$ are added and allowed to stand 15–20 sec. This solution is neutralized with additional $H_2SO_4$ and titrated.

Carbon and hydrogen were determined by microcombustion by weighing 10 to 20 mg. of sample into a micro platinum boat and treating it in an A. H. Thomas combustion apparatus, Catalog No. 6447-E, Philadelphia, Pa.

The materials in these examples were fired in an Astro Industries Furnace 1000A Water cooled graphite heated model 1000.3060-FP-12 under argon.

Derivatization gas chromatography is an analysis wherein the polymer is treated with tetraethoxysilane (EOS) and KOH to give the organoethoxysilane derivatives of the individual polymeric units. Gas chromatography is then used to determine the content and relative ratios of the various units present in the mixture. This procedure is carried out by weighing about 0.3 gm of the polymer sample into a 50 ml. round-bottomed flask. To this flask is added 8.0 ml. of $Si(OC_2H_5)_4$. One pellet of KOH is added and the flask is heated to initiate the reaction and it is then refluxed for 45 min. to one hour. An additional 2.0 ml. of $Si(OC_2H_5)_4$ is added and then about ½ teaspoon of pulverized $CO_2$ is added to neutralize the KOH. The sample is centrifuged to separate the phases. The silane layer is then analyzed by gas chromatography which has been standardized.

In the reactions carried out below, the reaction apparatus was essentially the same in each case and consisted of a 500 ml., glass, round-bottomed flask equipped with a mechanical stirrer, gas inlet tube, distillation apparatus and a thermocouple to record temperature. The distillation apparatus was equipped to use a vacuum if needed.

EXAMPLE 1

Methyltrichlorosilane 37.7 gms (0.25 mole), dimethyldichlorosilane 97.0 gms (0.75 mole) and 364.4 gms (2.3 moles) of $\{(CH_3)_3Si\}_2NH$ were combined in an apparatus described above. This combination was heated in an argon atmosphere to 300° C. Distillation began when the flask temperature reached 93° C. At 200° C., the flask contents had turned clear orange in color. The flask was held at 300° C. for about 10 min. The material was transferred to a glass bottle and kept under an argon blanket while cooling to room temperature. The result was a brown, sticky material which when cooled to room temperature was gummy. Yield of polymer was 27.9% of theory. TGA 1000° C. in argon gave 36% yield of ceramic. DTA 500° C. in argon showed no transitions. DTA 500° C. in air showed an exotherm at 245° C. % Si was 42.8 and infra red analysis showed —NH—, NH$_4$Cl, SiMe, SiNSi. Astro firing from room temperature to 1200° C. gave a 33.5% yield of ceramic. 1200°-1600° C. gave an 82.5% yield. EOS Derivatization showed 4% Me$_3$Si, 21% Me$_2$Si and 39% MeSi. Fibers could not be pulled from this material.

EXAMPLE 2

Thirty and eight tenths grams (0.21 moles) of methyltrichlorosilane, 106.2 gms (0.82 moles) of (CH$_3$)$_2$SiCl$_2$ and 355.5 gms (2.2 moles) of {(CH$_3$)$_3$Si}$_2$NH were combined and heated in a reaction flask equipped as set forth above. Under an argon gas flow, the flask was heated while distillate was removed beginning at 95° C. The color of the flask contents gradually turned from clear to yellow to brown. The flask was heated to 300° C. and held there for 15 minutes. The flask was allowed to cool over a sixteen hour period under a blanket of argon. The result was a dark brown liquid. TGA at 1000° C. in argon yielded 10% of ceramic material.

EXAMPLE 3

The following ingredients were reacted in a flask equipped as set forth above.

| | |
|---|---|
| CH$_3$SiCl$_3$ | 75.6 gms (.51 moles) |
| (CH$_3$)$_2$SiCl$_2$ | 65.7 gms (.51 moles) |
| {(CH$_3$)$_3$Si}$_2$NH | 409.6 gms (2.5 moles) |

These materials were heated together to 300° C. in an argon atmosphere and held there for 15 minutes. The material was then cooled under argon to yield 39.2 gms of a very hard, yellow material. Percent yield of polymer was 56.5%. TGA at 1000° C. in argon gave a 41% yield of ceramic material. DTA at 500° C. in argon showed no transitions. DTA in air at 500° C. showed an exotherm at 220° C. %Si was 42.4. Infra red analysis showed the presence of —NH—, SiCH$_3$, Si—N—Si. The material was fired in the Astro furnace from room temperature to 1200° C. to give a 37.3% yield of silicon carbide. When fired from 1200°-1600° C. an 84.9% yield of silicon carbide was realized. EOS derivatization of the polymer showed the presence of 0.12% (CH$_3$)$_3$Si—, 10.5% of (CH$_3$)$_2$Si= and 53% of CH$_3$Si≡.

EXAMPLE 4

The following ingredients were placed together in a reaction flask which was equipped as above.

| | |
|---|---|
| CH$_3$SiCl$_3$ | 117.9 gms (.79 mole) |
| (CH$_3$)$_2$SiCl$_2$ | 63.9 gms (.49 mole) |
| {(CH$_3$)$_3$Si}$_2$NH | 536.8 gms (3.3 moles) |

These materials were heated to 275° C. under an argon atmosphere and maintained for 1 hour. The material was cooled to room temperature under argon to yield 54.6 gms of a hard, brittle yellow polymer. The yield of polymer was 63.6%. TGA at 1000° C. in argon gave a 51% yield of ceramic material. DTA at 500° C. in argon showed no transitions. DTA at 500° C. in air showed an exotherm to 200° C. %Si was 42.0. Infrared analysis showed the presence of —NH—, NH$_4$Cl, SiCH$_3$, Si—N—Si. When fired in an Astro furnace from room temperature to 1200° C., a 44.9% yield of ceramic material was realized. When fired from 1200°-1600° C., a yield of ceramic material of 75.8% was realized. EOS derivatization showed 7.2% (CH$_3$)$_3$Si—, 7.3% (CH$_3$)$_2$Si and 61% CH$_3$Si≡.

EXAMPLE 5-18

Several reactions were carried out in these examples to illustrate the various chlorosilanes that could be used herein. The reactions were carried out in a reaction flask, equipped as set forth above, for the times and temperatures set forth in Table I. The results of the reactions are also set forth in Table I as well as some firing properties.

TABLE I

| Example | Reactants | Quantity gms | Temp. °C. | Time min. | Silazane Polymer Description material | % yield | yield of ceramic using TGA at 1000° C. in argon |
|---|---|---|---|---|---|---|---|
| 5 | CH$_3$SiCl (CH$_3$)$_2$SiCl$_2$ {(CH$_3$)$_3$Si}$_2$NH | 154.9 68.6 644.0 | 275 | 60 | Brittle yellow solid | 76.0 | 45% yield |
| 6 | CH$_3$SiCl$_3$ (CH$_3$)$_2$SiCl$_2$ {(CH$_3$)$_3$Si}$_2$NH | 126.7 45.3 516.0 | 200 | 30 | milky white solid | 43.1 | 55% yield |
| 7 | CH$_3$SiCl$_3$ (CH$_3$)$_2$SiCl$_2$ {(CH$_3$)$_3$Si}$_2$NH | 116.7 33.1 452.0 | 220 | 15 | milky white solid | 63.6 | 52.0% yield |
| 8 | CH$_3$SiCl$_3$ (CH$_3$)$_2$SiCl$_2$ {(CH$_3$)$_3$Si}$_2$NH | 119.6 27.2 451.8 | 220 | 15 | pale yellow solid | 74.2 | 50.0% yield |
| 9 | CH$_3$SiCl$_3$ (CH$_3$)$_2$SiCl$_2$ {(CH$_3$)$_3$Si}$_2$NH | 130.8 21.2 467.7 | 220 | 15 | milky white | 71.3 | 54.0% yield |
| 10 | CH$_3$SiCl$_3$ (CH$_3$)$_2$SiCl$_2$ {(CH$_3$)$_3$Si}$_2$NH | 138.7 13.6 465.3 | 220 | 15 | milky white brittle | 77.0 | 51.0% yield |
| 11 | CH$_3$SiCl$_3$ (CH$_3$)$_2$SiCl$_2$ {(CH$_3$)$_3$Si}$_2$NH | 143.5 6.5 476.1 | 200 | 15 | milky white solid | 87.1 | 54.0% yield |
| 12 | CH$_3$SiCl$_3$ (CH$_3$)$_2$SiCl$_2$ | 853.5 40.2 | 300 | 60 | hard yellow | 89.4 | — |

TABLE I-continued

| Example | | | | | | | |
|---|---|---|---|---|---|---|---|
| 13 | {(CH$_3$)$_3$Si}$_2$NH<br>CH$_3$SiCl$_3$<br>{(CH$_3$)$_3$Si}$_2$NH | 2854.4<br>150.0<br>483.9 | 180 | 15 | solid hard white solid | 77.1 | 57.0% yield |
| 14 | CH$_3$SiCl$_3$<br>{(CH$_3$)$_3$Si}$_2$NH | 899.6<br>2910.9 | 300 | 120 | hard yellow solid | 97.6 | — |
| 15 | CH$_3$(CH$_2$)$_2$SiCl$_3$<br>{(CH$_3$)$_3$Si}$_2$NH | 177.6<br>486.3 | 261 | 5 | thick gummy semi-solid | — | — |
| 16 | (CH$_3$)(C$_6$H$_5$)SiCl$_2$<br>{(CH$_3$)$_3$Si}$_2$NH | 191.9<br>330.2 | 300 vacuum 0mm Hg | few sec. | hard light brown solid | — | — |
| 17 | C$_6$H$_5$SiCl$_3$<br>{(CH$_3$)$_3$Si}$_2$NH | 213.3<br>484.7 | 240 | 5 | off-white, hard glassy solid | — | — |
| 18 | CH$_2$=CHSiCl$_3$<br>{(CH$_3$)$_3$Si}$_2$NH | 165.5<br>486.1 | 300 | 6 | tough, milky white semi-solid | — | — |

| Example | DTA 500° C. Argon | DTA 500° C. Air | % Si | Infrared | Fired Ceramic yield in % | | EOS |
|---|---|---|---|---|---|---|---|
| | | | | | 25° C.–1200 | 1200–1600° C. | |
| 5 | Decomposed 310–410 | Exotherm 320° C. | 40.8 | NH<br>NH$_4$Cl<br>≡SiCH$_3$<br>Si—N—Si | 41.7 | 81.1 | 12% (CH$_3$)$_3$Si—<br>7% (CH$_3$)$_2$Si=<br>— CH$_3$Si≡ |
| 6 | No transition | Exotherm 235° C. | 41 | NH<br>NH$_4$Cl<br>≡SiCH$_3$<br>Si—N—Si | 50.6 | 78.9 | 8% (CH$_3$)$_3$Si—<br>4% (CH$_3$)$_2$Si=<br>63% CH$_3$Si≡ |
| 7 | No transition | Exotherm 240° C. | 40.7 | NH<br>NH$_4$Cl<br>≡SiCH$_3$<br>Si—N—Si | 45.5 | 84.2 | 5% (CH$_3$)$_3$Si—<br>5.4% (CH$_3$)$_2$Si=<br>57.4% CH$_3$Si≡ |
| 8 | No transition | Exotherm 235° C. | 40.7 | NH<br>NH$_4$Cl<br>≡SiCH$_3$<br>Si—N—Si | 44.8 | 86.0 | 10% (CH$_3$)$_3$Si—<br>5% (CH$_3$)$_2$Si=<br>66.3% CH$_3$Si≡ |
| 9 | Possible transition at 235–300° C. | Exotherm 240° C. | 42.1 | NH<br>NH$_4$Cl<br>≡SiCH$_3$<br>Si—N—Si | 49.0 | 88.1 | 8.4% (CH$_3$)$_3$Si—<br>4.0% (CH$_3$)$_2$Si=<br>67.0% CH$_3$Si≡ |
| 10 | No transition | Exotherm 225° C. | 41.6 | NH<br>NH$_4$Cl<br>≡SiCH$_3$<br>Si—N—Si | 25° C.–1200° C.<br>48.4 | 1200–1600° C.<br>87.9 | 8% (CH$_3$)$_3$Si—<br>3.3% (CH$_3$)$_2$Si=<br>65% CH$_3$Si≡ |
| 11 | No transition | Exotherm 225° C. | 42.0 | NH<br>NH$_4$Cl<br>≡SiCH$_3$<br>Si—N—Si | 46.8 | 88.3 | 19.5% (CH$_3$)$_3$Si—<br>3.0% (CH$_3$)$_2$Si=<br>81.0% CH$_3$Si≡ |
| 12 | — | — | 41.0 | NH<br>NH$_4$Cl<br>≡SiCH$_3$<br>Si—N—Si | — | — | — |
| 13 | Endotherm 25° C.–120° C. | Endotherm 25° C.–120° C.<br>Exo @ 220° C. | 41.4 | NH<br>NH$_4$Cl<br>≡SiCH$_3$<br>Si—N—Si | 50.2 | 87.3 | 8% (CH$_3$)$_3$Si—<br>3% (CH$_3$)$_2$Si=<br>70% CH$_3$Si≡ |
| 14 | Endotherm 25° C.–120° C. | Endotherm 25° C.–120° C.<br>Exo @ 220° C. | 42.5 | NH<br>NH$_4$Cl<br>≡SiCH$_3$<br>Si—N—Si | — | — | — |
| 15 | — | — | 31.0 | Si—propyl<br>C—N—C<br>Si—N—Si | 25° C.–1200° C.<br>3.07 | 1200–1600° C.<br>74.9 | — |
| 16 | — | — | 22.0 | OH<br>NH<br>NH$_4$Cl<br>SiC$_6$H$_5$<br>SiCH$_3$<br>Si—N—Si<br>(C$_6$H$_5$), (CH$_3$), SiNH$_3$ | 23.7 | 93.1 | — |
| 17 | — | — | | NH<br>NH$_4$Cl<br>SiC$_6$H$_5$ | 37.7 | 95.9 | — |

TABLE I-continued

| | | | | | | |
|---|---|---|---|---|---|---|
| 18 | — | — | SiCH$_3$<br>Si—N—Si<br>Si—O—Si<br>NH<br>SiCH=CH$_2$<br>SiCH$_3$<br>Si(CH$_3$)$_3$<br>Si—N—Si<br>Si—O—Si | 61.8 | 82.6 | — — |

That which is claimed is:

1. A process of preparing an R'$_3$SiNH— containing silazane polymer which consists of contacting and reacting in an inert, essentially anhydrous, atmosphere, an organochlorosilane or a mixture of organochlorosilanes of the general formula $$R_nSiCl_{4-n}$$

with a disilazane having the general formula $$(R'_3Si)_2NH$$

at a temperature in the range of 25° C. to 300° C. while distilling by-produced volatile products, wherein
R is vinyl, an alkyl group of 1-3 carbon atoms or phenyl;
R' is vinyl, hydrogen, an alkyl group of 1-3 carbon atoms or phenyl; and
n has a value of 1 or 2.

2. A process as claimed in claim 1 wherein the organochlorosilane is an alkylchlorosilane.

3. A process as claimed in claim 2 wherein the alkylchlorosilane is CH$_3$SiCl$_3$.

4. A process as claimed in claim 1 wherein the organochlorosilane is CH$_2$=CHSiCl$_3$.

5. A process as claimed in claim 2 wherein the alkylchlorosilane is CH$_3$(CH$_2$)$_2$SiCl$_3$.

6. A process as claimed in claim 2 wherein the alkylchlorosilane is CH$_3$CH$_2$SiCl$_3$.

7. A process as claimed in claim 3 wherein (R'$_3$Si)$_2$NH is {(CH$_3$)$_3$Si}$_2$NH.

8. A process as claimed in claim 3 wherein (R'$_3$Si)$_2$NH is {(CH$_3$)$_2$CH$_2$=CHSi}$_2$NH.

9. A process as claimed in claim 3 wherein (R'$_3$Si)$_2$NH is {CH$_3$(C$_6$H$_5$)$_2$Si}$_2$NH.

10. A process as claimed in claim 3 wherein (R'$_3$Si)$_2$NH is {C$_6$H$_5$(CH$_3$)$_2$Si}$_2$NH.

11. A process as claimed in claim 3 wherein (R'$_3$Si)$_2$NH is {H(CH$_3$)$_2$Si}$_2$NH.

12. A process as claimed in claim 4 wherein (R'$_3$Si)$_2$NH is {(CH$_3$)$_3$Si}$_2$NH.

13. A process as claimed in claim 4 wherein (R'$_3$Si)$_2$NH is {(CH$_3$)$_2$CH$_2$=CHSi}$_2$NH.

14. A process as claimed in claim 4 wherein (R'$_3$Si)$_2$NH is {CH$_3$(C$_6$H$_5$)$_2$Si}$_2$NH.

15. A process as claimed in claim 4 wherein R'$_3$Si)$_2$NH is {C$_6$H$_5$(CH$_3$)$_2$Si}$_2$NH.

16. A process as claimed in claim 4 wherein (R'$_3$Si)$_2$NH is {H(CH$_3$)$_2$Si}$_2$NH.

17. A process as claimed in claim 5 wherein (R'$_3$Si)$_2$NH is {(CH$_3$)$_3$Si}$_2$NH.

18. A process as claimed in claim 5 wherein (R'$_3$Si)$_2$NH is {(CH$_3$)$_2$CH$_2$=CHSi}$_2$NH.

19. A process as claimed in claim 5 wherein (R'$_3$Si)$_2$NH is {CH$_3$(C$_6$H$_5$)$_2$Si}$_2$NH.

20. A process as claimed in claim 5 wherein (R'$_3$Si)$_2$NH is {C$_6$H$_5$(CH$_3$)$_2$Si}$_2$NH.

21. A process as claimed in claim 5 wherein (R'$_3$Si)$_2$NH is {H(CH$_3$)$_2$Si}$_2$NH.

22. A process as claimed in claim 6 wherein (R'$_3$Si)$_2$NH is {(CH$_3$)$_3$Si}$_2$NH.

23. A process as claimed in claim 6 wherein (R'$_3$Si)$_2$NH is {(CH$_3$)$_2$CH$_2$=CHSi}$_2$NH.

24. A process as claimed in claim 6 wherein (R'$_3$Si)$_2$NH is {CH$_3$(C$_6$H$_5$)$_2$Si}$_2$NH.

25. A process as claimed in claim 6 wherein (R'$_3$Si)$_2$NH is {C$_6$H$_5$(CH$_3$)$_2$Si}$_2$NH.

26. A process as claimed in claim 6 wherein (R'$_3$Si)$_2$NH is {H(CH$_3$)$_2$Si}$_2$NH.

27. A process as claimed in claim 1 wherein the organochlorosilane is C$_6$H$_5$SiCl$_3$.

28. A process as claimed in claim 27 wherein the disilazane is {(CH$_3$)$_3$Si}$_2$NH.

29. A process as claimed in claim 27 wherein the disilazane is {(CH$_3$)$_2$CH$_2$=CHSi}$_2$NH.

30. A process as claimed in claim 27 wherein the disilazane is {CH$_3$(C$_6$H$_5$)$_2$Si}$_2$NH.

31. A process as claimed in claim 27 wherein the disilazane (R'$_3$Si)$_2$NH is {C$_6$H$_5$(CH$_3$)$_2$Si}$_2$NH.

32. A process as claimed in claim 27 wherein the disilazane (R'$_3$Si)$_2$NH is {H(CH$_3$)$_2$Si}$_2$NH.

33. A process as claimed in claim 1 wherein there is a mixture of organochlorosilanes and the disilazane is {(CH$_3$)$_3$Si}$_2$NH.

34. A process as claimed in claim 1 wherein there is a mixture of organochlorosilanes and the disilazane is {(CH$_3$)$_2$CH$_2$=CHSi}$_2$NH.

35. A process as claimed in claim 1 wherein there is a mixture of organochlorosilanes and the disilazane is {CH$_3$(C$_6$H$_5$)$_2$Si}$_2$NH.

36. A process as claimed in claim 1 wherein there is a mixture of organochlorosilanes and the disilazane is {C$_6$H$_5$(CH$_3$)$_2$Si}$_2$NH.

37. A process as claimed in claim 1 wherein there is a mixture of organochlorosilanes and the disilazane is {H(CH$_3$)$_2$Si}$_2$NH.

38. A process as defined in claim 1 wherein in the organochlorosilane or mixture of organochlorosilanes the number of diorgano-substituted silicon atoms does not exceed the number of monoorgano-substituted silicon atoms, and the temperature is in the range of 125° C. to 300° C.

39. An R'$_3$SiNH— containing silazane polymer prepared by the process of claim 1.

40. A composition as claimed in claim 39 wherein the organochlorosilane is an alkylchlorosilane and the disilazane is (R'$_3$Si)$_2$NH.

41. A composition as claimed in claim 40 wherein the alkylchlorosilane is CH$_3$SiCl$_3$ and the disilazane is (R'$_3$Si)$_2$NH.

42. A composition as claimed in claim 39 wherein the organochlorosilane is CH$_2$=CHSiCl$_3$ and the disilazane is (R'$_3$Si)$_2$NH.

43. A composition as claimed in claim 40 wherein the alkylchlorosilane is CH$_3$(CH$_2$)$_2$SiCl$_3$ and the disilazane is (R'$_3$Si)$_2$NH.

44. A composition as claimed in claim 40 wherein the alkylchlorosilane is CH$_3$CH$_2$SiCl$_3$ and the disilazane is (R'$_3$Si)$_2$NH.

45. A composition as claimed in claim 41 wherein the disilazane is {(CH$_3$)$_3$Si}$_2$NH.

46. A composition as claimed in claim 41 wherein the disilazane is {(CH$_3$)$_2$CH$_2$=CHSi}NH.

47. A composition as claimed in claim 41 wherein the disilazane is {CH$_3$(C$_6$H$_5$)$_2$Si}$_2$NH.

48. A composition as claimed in claim 41 wherein the disilazane is {C$_6$H$_5$(CH$_3$)$_2$Si}$_2$NH.

49. A composition as claimed in claim 41 wherein the disilazane is {H(CH$_3$)$_2$Si}$_2$NH.

50. A composition as claimed in claim 42 wherein the disilazane is {(CH$_3$)$_3$Si}$_2$NH.

51. A composition as claimed in claim 42 wherein the disilazane is {(CH$_3$)$_2$CH$_2$=CHSi}NH.

52. A composition as claimed in claim 42 wherein the disilazane is {CH$_3$(C$_6$H$_5$)$_2$Si}$_2$NH.

53. A composition as claimed in claim 42 wherein the disilazane is {C$_6$H$_5$(CH$_3$)$_2$Si}$_2$NH.

54. A composition as claimed in claim 42 wherein the disilazane is {H(CH$_3$)$_2$Si}$_2$NH.

55. A composition as claimed in claim 43 wherein the disilazane is {(CH$_3$)$_3$Si}$_2$NH.

56. A composition as claimed in claim 43 wherein the disilazane is {(CH$_3$)$_2$CH$_2$=CHSi}NH.

57. A composition as claimed in claim 43 wherein the disilazane is {CH$_3$(C$_6$H$_5$)$_2$Si}$_2$NH.

58. A composition as claimed in claim 43 wherein the disilazane is {C$_6$H$_5$(CH$_3$)$_2$Si}$_2$NH.

59. A composition as claimed in claim 43 wherein the disilazane is {H(CH$_3$)$_2$Si}$_2$NH.

60. A composition as claimed in claim 44 wherein the disilazane is {(CH$_3$)$_3$Si}$_2$NH.

61. A composition as claimed in claim 44 wherein the disilazane is {(CH$_3$)$_2$CH$_2$=CHSi}NH.

62. A composition as claimed in claim 44 wherein the disilazane is {CH$_3$(C$_6$H$_5$)$_2$Si}$_2$NH.

63. A composition as claimed in claim 44 wherein the disilazane is {C$_6$H$_5$(CH$_3$)$_2$Si}$_2$NH.

64. A composition as claimed in claim 44 wherein the disilazane is {H(CH$_3$)$_2$Si}$_2$NH.

65. A composition as claimed in claim 39 wherein the organochlorosilane is C$_6$H$_5$SiCl$_3$ and the disilazane is {R'$_3$Si}$_2$NH.

66. A composition as claimed in claim 65 wherein the disilazane is {(CH$_3$)$_3$Si}$_2$NH.

67. A composition as claimed in claim 65 wherein the disilazane is {(CH$_3$)$_2$CH$_2$=CHSi}$_2$NH.

68. A composition as claimed in claim 65 wherein the disilazane is {CH$_3$(C$_6$H$_5$)$_2$Si}$_2$NH.

69. A composition as claimed in claim 65 wherein the disilazane is {C$_6$H$_5$(CH$_3$)$_2$Si}$_2$NH.

70. A composition as claimed in claim 65 wherein the disilazane is {H(CH$_3$)$_2$Si}$_2$NH.

71. A composition of matter as claimed in claim 39 which is an R'$_3$SiNH— containing silazane polymer which is prepared by contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $$R_n SiCl_{4-n}$$

with a disilazane having the general formula
(R'$_3$Si)$_2$NH at a temperature in the range of 125° C. to 300° C. while distilling by-produced volatile products, wherein
R is vinyl, an alkyl group of 1-3 carbon atoms or phenyl;
R' is vinyl, hydrogen, an alkyl group of 1-3 carbon atoms or phenyl; and
n has a value of 1 or 2.

72. A method for preparing a silicon carbide-containing ceramic material which consists of heating a silazane polymer in an inert atmosphere or in a vacuum to at least a temperature of 750° C. until the silazane polymer is converted to silicon carbide ceramic material, which silazane polymer is obtained by a process which consists of contacting and reacting in an inert, essentially anhydrous, atmosphere, an organochlorosilane or a mixture of organochlorosilanes of the general formula $$R_n SiCl_{4-n}$$

with a disilazane having the general formula
(R'$_3$Si)$_2$NH at a temperature in the range of 25° C. to 300° C. while distilling by-produced volatile products, wherein
R is vinyl, an alkyl group of 1-3 carbon atoms or phenyl;
R' is vinyl, hydrogen, an alkyl group of 1-3 carbon atoms or phenyl; and
n has a value of 1 or 2.

73. The material prepared by the method of claim 72.

74. A method of preparing a silicon carbide-containing ceramic article which consists of
(A) forming an article of the desired shape from a silazane polymer;
(B) heating the article formed in (A) in an inert atmosphere or in a vacuum to an elevated temperature of at least 750° C. until the silazane polymer is converted to silicon carbide-containing ceramic, which silazane polymer is obtained by a process which consists of contacting and reacting in an inert, essentially anhydrous, atmosphere, an organochlorosilane or a mixture of organochlorosilanes, wherein the number of diorgano-substituted silicon atoms does not exceed the number of monoorgano-substituted silicon atoms, of the general formula $$R_n SiCl_{4-n}$$

with a disilazane having the general formula (R'$_3$Si)$_2$NH at a temperature in the range of 125° C. to 300° C. while distilling by-produced volatile products, wherein
R is vinyl, an alkyl group of 1-3 carbon atoms or phenyl;
R' is vinyl, hydrogen, an alkyl group of 1-3 carbon atoms or phenyl and
n has a value of 1 or 2.

75. The article prepared by the method in claim 74.

76. The method of claim 74 wherein at least one conventional ceramic filler is mixed with the silazane polymer prior to forming an article of the desired shape.

77. The filled article prepared by the method of claim 76.

78. A method of preparing an article coated with ceramic which consists of (A) coating a substrate with a silazane polymer which silazane polymer is obtained by a process which consists of contacting and reacting in an inert, essentially anhydrous, atmosphere, an organochlorosilane or a mixture of organochlorosilanes of the general formula $$R_n SiCl_{4-n}$$

with a disilazane having the general formula $$(R'_3Si)_2NH$$

at a temperature in the range of 25° C. to 300° C. while distilling by-produced volatile products, wherein R is vinyl, an alkyl group of 1–3 carbon atoms or phenyl;

R' is vinyl, hydrogen, an alkyl group of 1–3 carbon atoms or phenyl and n has a value of 1 or 2 and (B) heating the coated substrate in an inert atmosphere or in a vacuum, to an elevated temperature of at least 750° C. until the coating is converted to a silicon carbide ceramic material, whereby a silicon carbide-containing ceramic coated article is obtained.

79. The method of claim 78 wherein at least one conventional ceramic filler is mixed with the silazane polymer prior to coating the substrate.

80. The coated article prepared by the method of claim 78.

81. The coated article prepared by the method of claim 79.

* * * * *